(12) United States Patent
Toda et al.

(10) Patent No.: US 11,803,452 B2
(45) Date of Patent: Oct. 31, 2023

(54) DUPLEXED OPERATION SYSTEM AND METHOD THEREFOR

(71) Applicant: Nippon Telegraph and Telephone Corporation, Tokyo (JP)

(72) Inventors: Takato Toda, Tokyo (JP); Nobuhiro Kimura, Tokyo (JP); Kotaro Mihara, Tokyo (JP)

(73) Assignee: Nippon Telegraph and Telephone Corporation, Tokyo (JP)

( * ) Notice: Subject to any disclaimer, the term of this patent is extended or adjusted under 35 U.S.C. 154(b) by 300 days.

(21) Appl. No.: 17/429,059

(22) PCT Filed: Jan. 31, 2020

(86) PCT No.: PCT/JP2020/003585
§ 371 (c)(1),
(2) Date: Aug. 6, 2021

(87) PCT Pub. No.: WO2020/166367
PCT Pub. Date: Aug. 20, 2020

(65) Prior Publication Data
US 2022/0129359 A1 Apr. 28, 2022

(30) Foreign Application Priority Data
Feb. 14, 2019 (JP) .................. 2019-024387

(51) Int. Cl.
*G06F 11/00* (2006.01)
*G06F 11/20* (2006.01)
*G06F 9/455* (2018.01)

(52) U.S. Cl.
CPC ...... *G06F 11/2028* (2013.01); *G06F 9/45558* (2013.01); *G06F 11/2025* (2013.01);
(Continued)

(58) Field of Classification Search
CPC ............... G06F 11/202; G06F 11/2023; G06F 11/2025; G06F 11/2028; G06F 11/2033;
(Continued)

(56) References Cited

U.S. PATENT DOCUMENTS 7,313,637 B2 * 12/2007 Tanaka ................ G06F 11/1484
710/18
9,513,946 B2 * 12/2016 Sevigny .............. G06F 9/45558
(Continued)

FOREIGN PATENT DOCUMENTS

CN 106817238 A * 6/2017
JP 5392594 B2 * 1/2014
(Continued)

OTHER PUBLICATIONS

Kurokawa et al., "Network Technologies for Next Generation Networks," IEICE Communication Society Magazine, 2010, 2010(13): 10-21, 25 pages (With English Translation).

*Primary Examiner* — Anthony J Amoroso
(74) *Attorney, Agent, or Firm* — Fish & Richardson P.C.

(57) ABSTRACT

A duplex operation system including: a plurality of general-purpose devices on each of which a plurality of virtual machines are mounted; and a virtual machine controller that controls a duplex operation performed by two systems, an active system and a standby system, of the virtual machines. When detecting a failure of the active system, the virtual machine controller stops the virtual machine of the active system, activates the virtual machine of the standby system corresponding to the stopped active system, and reconfigures the standby system of the activated virtual machine on the hardware of the stopped virtual machine, and when detecting a failure in the virtual machine of the reconfigured standby system, the virtual machine controller reconfigures the standby system of the failed virtual machine on the
(Continued)

general-purpose device 13 different from the general-purpose device 11 in which the virtual machine of the active system has been stopped.

4 Claims, 5 Drawing Sheets

(52) U.S. Cl.
CPC .................. *G06F 11/2033* (2013.01); *G06F 2009/45562* (2013.01); *G06F 2009/45575* (2013.01); *G06F 2009/45591* (2013.01); *G06F 2201/815* (2013.01)

(58) Field of Classification Search
CPC ............ G06F 11/2035; G06F 11/2038; G06F 11/2041; G06F 11/2043; G06F 11/2046; G06F 11/2048; G06F 2009/45562; G06F 2009/45575; G06F 2009/45591; G06F 2201/815; G06F 9/45558
See application file for complete search history.

(56) References Cited

U.S. PATENT DOCUMENTS

| | | | |
|---|---|---|---|
| 2011/0072430 A1* | 3/2011 | Mani .................. | G06F 1/30 718/1 |
| 2012/0266018 A1* | 10/2012 | Tanaka ................ | G06F 11/2097 714/E11.119 |
| 2015/0363282 A1* | 12/2015 | Rangasamy ........ | G06F 11/2033 714/4.12 |

FOREIGN PATENT DOCUMENTS

| | | | |
|---|---|---|---|
| JP | 2015002482 A | * | 1/2015 |
| WO | WO-2017092539 A1 | * | 6/2017 |

* cited by examiner

Fig. 5

| Detection | Active system | | Standby system | | Active system incorporating present embodiment | |
|---|---|---|---|---|---|---|
| | Restart | Escalation destination | Restart | Escalation destination | Restart | Escalation destination |
| PH0.5 | Run | PH1.0 | Run | Work by maintenance person | Run | Activate on other HW |
| PH1.0 | Run | PH2.0 | Work by maintenance person | Work by maintenance person | Activate on other HW | Activate on other HW |
| PH2.0 | Run | PH2.5 | Work by maintenance person | Work by maintenance person | Activate on other HW | Activate on other HW |
| PH2.5 | Run | PH3.0 | Work by maintenance person | Work by maintenance person | Activate on other HW | Activate on other HW |
| PH3.0 | Run | Work by maintenance person | Work by maintenance person | Work by maintenance person | Activate on other HW | Activate on other HW |
| HW failure | Work by maintenance person | Work by maintenance person | Work by maintenance person | Work by maintenance person | — | — |

DUPLEXED OPERATION SYSTEM AND METHOD THEREFOR

CROSS-REFERENCE TO RELATED APPLICATIONS

This application is a National Stage application under 35 U.S.C. § 371 of International Application No. PCT/JP2020/003585, having an International Filing Date of Jan. 31, 2020, which claims priority to Japanese Application Serial No. 2019-024387, filed on Feb. 14, 2019. The disclosure of the prior application is considered part of the disclosure of this application, and is incorporated in its entirety into this application.

TECHNICAL FIELD

The present invention relates to a technique capable of providing a highly available network system.

BACKGROUND ART

In a network system for providing a service, a server is duplicated into two systems, an active system and a standby system, for the purpose of ensuring the reliability of service provision. That is, when a failure is detected in the active system (ACT), a switch is made to the standby system (SBY) to prevent the interruption of the service provision and to enhance availability. The availability is the ability of the system to run continuously.

Such a duplex operation system is disclosed in, for example, Non-Patent Literature 1.

CITATION LIST

Non-Patent Literature

Non-Patent Literature 1: "Network Basic Technology Supporting Next-Generation Networks (NGN)," written by Akira Kurokawa and three others, Internet <URL: https://www.jstage.jst.go.jp/article/bplus/2010/13/2 010_13_13_10/pdf/-char/ja> (searched on Feb. 5, 2019)

SUMMARY OF THE INVENTION

Technical Problem

However, in the conventional duplex operation, when a failure is detected in the standby system, no switching occurs, and it is regulated that the virtual machine with the failure detected is stopped. Hence the duplex operation state collapses to a singular operation state. The work by a maintenance person has been required in order to restore the duplex operation state.

That is, there is a problem that the range in which the duplex operation state can be maintained is narrow, lowering the availability of the service provision.

The present invention has been made in view of the problem, and it is an object of the present invention to provide a system for duplex operation and a method therefor in which an expanded range where a duplex operation state can be maintained is expanded.

Means for Solving the Problem

A duplex operation system according to one aspect of the present invention is a duplex operation system including: a plurality of general-purpose devices on each of which a plurality of virtual machines are mounted; and a virtual machine controller that controls a duplex operation performed by two systems, an active system and a standby system, of the virtual machines. The gist of the system is that, when detecting a failure of the active system, the virtual machine controller stops the virtual machine of the active system, activates the virtual machine of the standby system corresponding to the stopped active system, and reconfigures the standby system of the activated virtual machine on hardware of the stopped virtual machine, and when detecting a failure in the virtual machine of the reconfigured standby system, the virtual machine controller reconfigures the standby system of the failed virtual machine on a general-purpose device different from the general-purpose device in which the virtual machine of the active system has been stopped.

A duplex operation method according to one aspect of the present invention is a duplex operation method performed by the above virtual machine controller. The gist of the method is to include a virtual machine control step in which, when detecting a failure of the active system, the virtual machine controller stops the virtual machine of the active system, activates the virtual machine of the standby system corresponding to the stopped active system, and reconfigures the standby system of the activated virtual machine on hardware of the stopped virtual machine, and when detecting a failure in the virtual machine of the reconfigured standby system, the virtual machine controller reconfigures the standby system of the failed virtual machine on a general-purpose device different from the general-purpose device in which the virtual machine of the active system has been stopped.

Effects of the Invention

According to the present invention, it is possible to provide a system for duplex operation and a method therefor in which an expanded range where a duplex operation state can be maintained is expanded.

BRIEF DESCRIPTION OF DRAWINGS

FIG. 5 is a diagram showing results of a comparison between the present embodiment and a comparative example.

DESCRIPTION OF EMBODIMENTS

Figure 1:
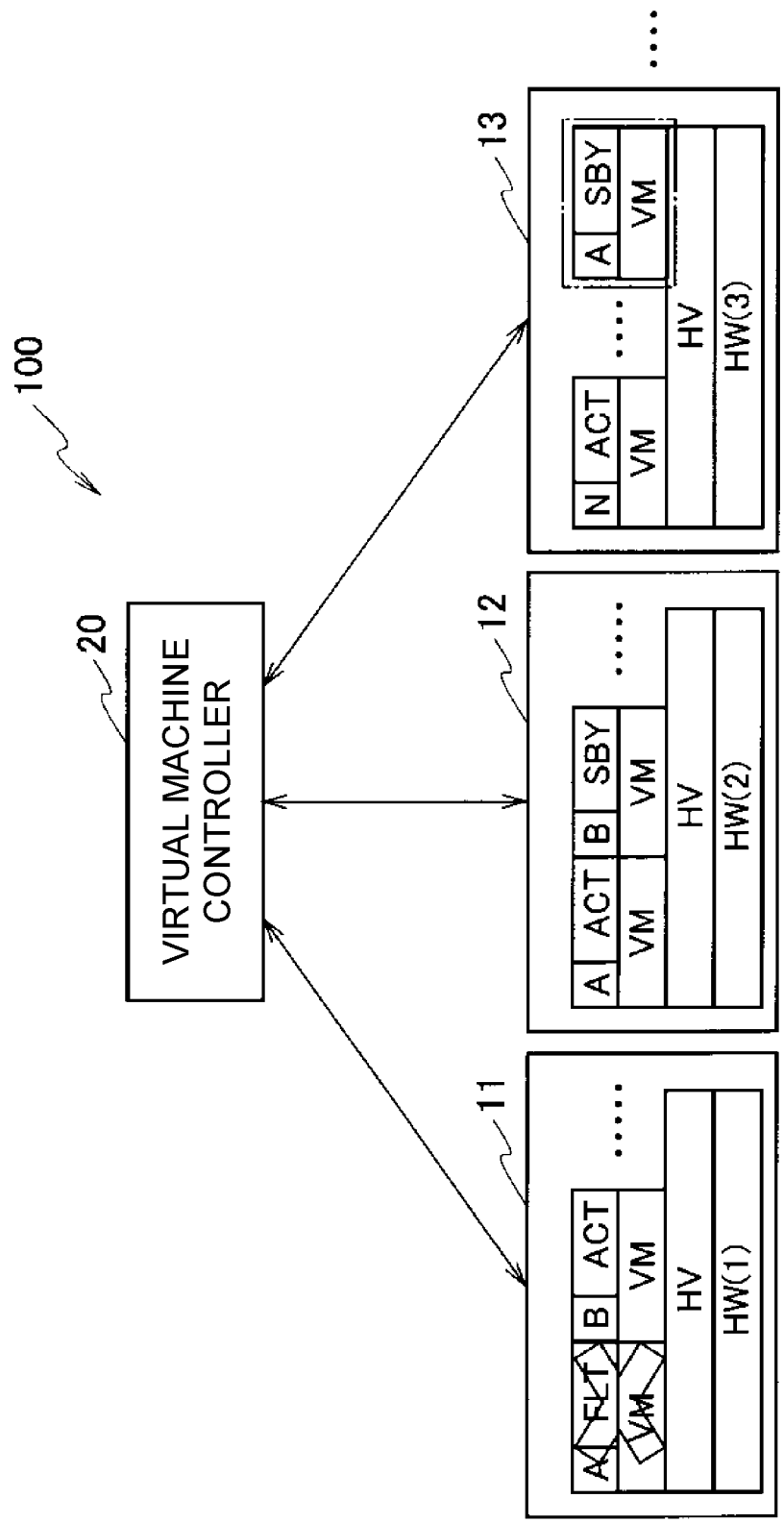
FIG. 1 is a block diagram showing a configuration example of a duplex operation system according to a first embodiment of the present invention.

Embodiments of the present invention will be described below with reference to the drawings. The same reference numerals are given to the same ones in a plurality of drawings, and the description thereof will not be repeated.

First Embodiment

Figure 2:
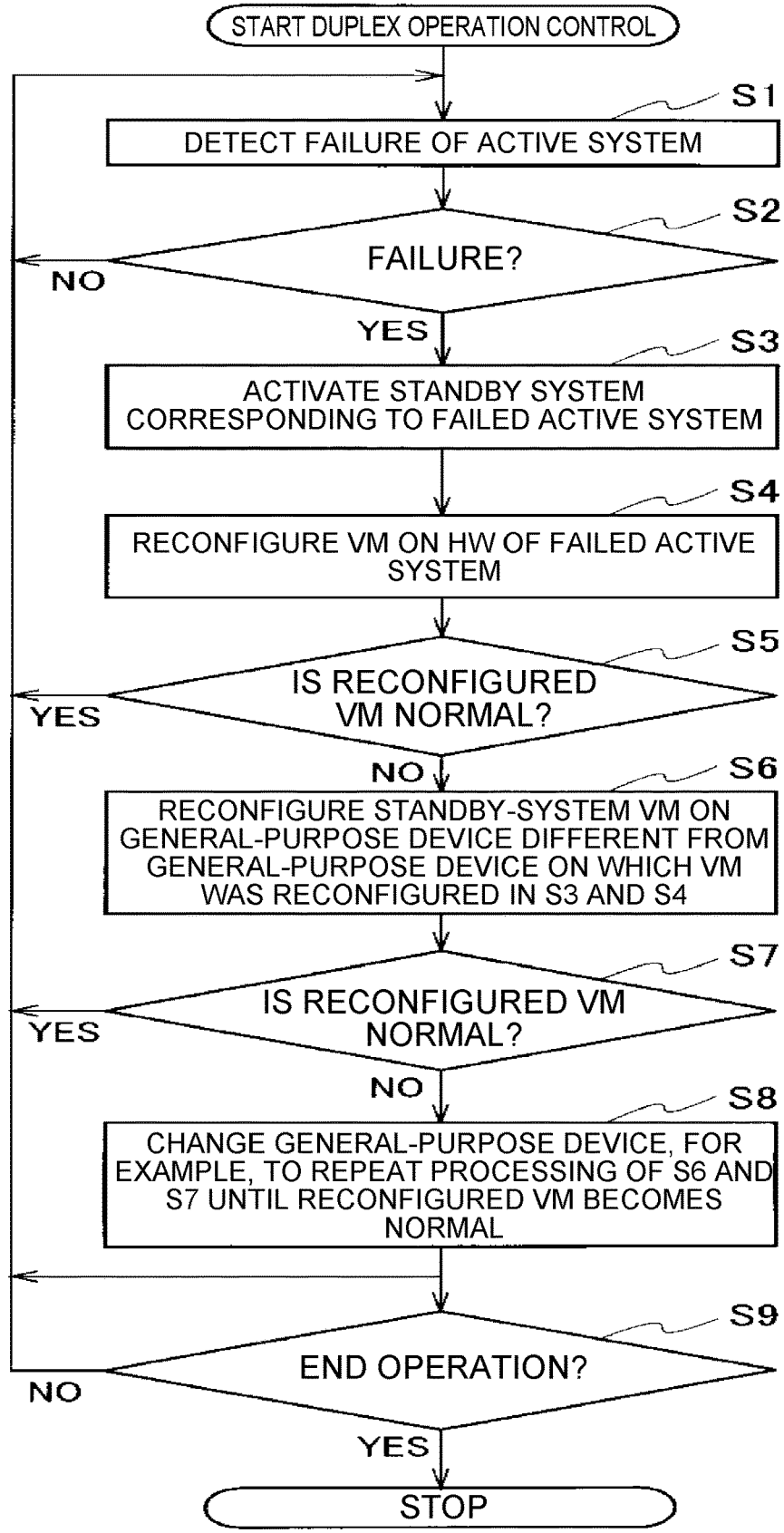
FIG. 2 is a flowchart showing a processing procedure of the outline of the duplex operation system shown in FIG. 1.

FIG. 1 is a block diagram showing a configuration example of a duplex operation system according to a first embodiment of the present invention. FIG. 2 is a flowchart showing a processing procedure of the outline of the duplex operation system 100 shown in FIG. 1.

The duplex operation system 100 includes a plurality of general-purpose devices 11, 12, 13 and a virtual machine controller 20. On each of the plurality of general-purpose devices 11, 12, 13, two or more virtual machines (VMs) (A, B, . . . ) are mounted. The virtual machine controller 20 controls a duplex operation performed by two systems, an active system (ACT) and a standby system (SBY), of the virtual machines.

Note that three or more general-purpose devices may be provided. In the following description, when it is not necessary to specify a general-purpose device, the term "general-purpose device 11" will be used. The type of the virtual machine is expressed by ACT, SBY, and alphabet. For example, a virtual machine A(ACT) means an active-system virtual machine A. HW(1) shown in FIG. 1 means hardware. HV is a hypervisor for activating a plurality of virtual machines A, B, . . . in parallel.

The general-purpose device 11 and the virtual machine controller 20 can be achieved by a computer made up of, for example, a read-only memory (ROM), a random-access memory (RAM), a central processing unit (CPU), and the like. In this case, the processing content of the function that each of the general-purpose device 11 and the virtual machine controller 20 needs to have is described by a program. This also applies to another embodiment described later.

Referring to FIGS. 1 and 2, the operation of the duplex operation system 100 will be described. Upon start of the operation, the virtual machine controller 20 detects a failure of the active-system virtual machine (ACT) (step S1). The virtual machine controller 20 detects a failure in accordance with any one of, for example, whether a process identification (ID) has been updated correctly, whether or not a response to the health check has been made, or whether the watchdog timer has been timed up. The failure detection is repeated until a failure is detected (NO in step S2).

Figure 3:
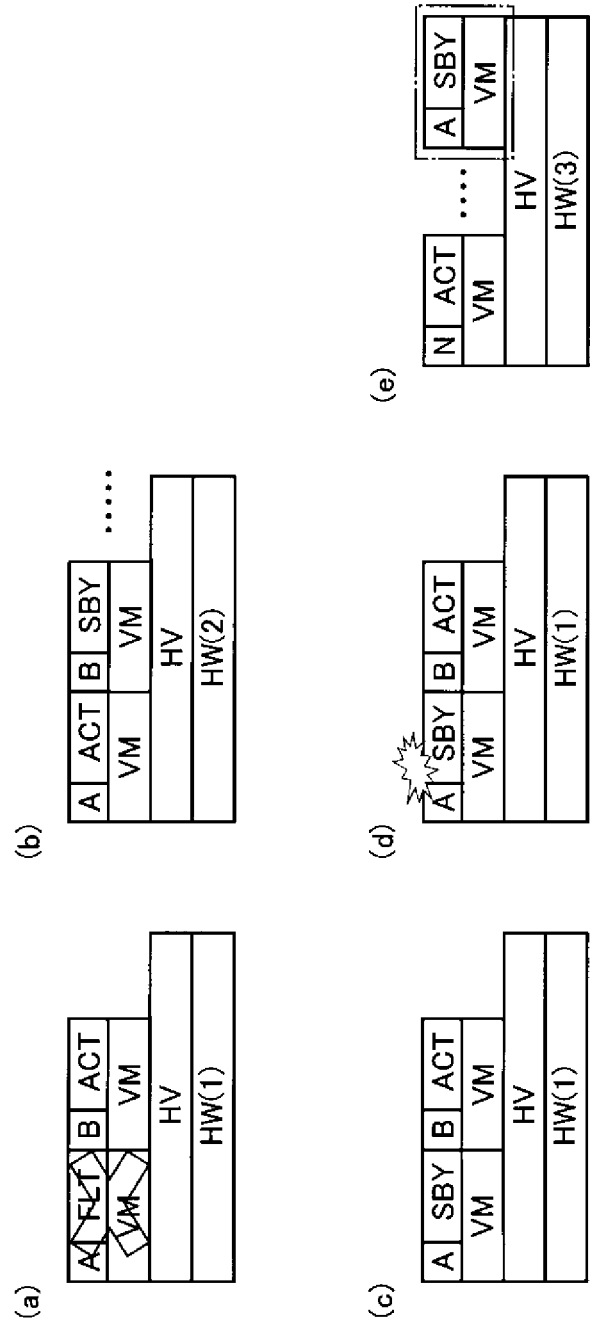
FIG. 3 is a diagram schematically showing the content of the processing performed by the duplex operation system shown in FIG. 1.

When detecting a failure of, for example, the active-system virtual machine A(ACT) (YES in step S2), the virtual machine controller 20 stops the active-system virtual machine A. FIG. 3(a) schematically shows this state. The virtual machine A is shifted from (ACT) to (FLT). (FLT) means fault (Fault).

Next, the virtual machine controller 20 activates the standby-system virtual machine A corresponding to the stopped virtual machine A (step S3). FIG. 3(b) schematically shows this state. In this example, the virtual machine A(SBY) located on HV of the general-purpose device 12 (HW(2)) is switched to the active system (virtual machine A(SBY)→(virtual machine A(ACT)).

Next, the virtual machine controller 20 reconfigures the standby-system virtual machine A on the failed active system hardware (step S4). As shown in FIG. 3(c), the virtual machine A(SBY) has been reconfigured on HV of the general-purpose device 11 (HW(1)).

Next, the virtual machine controller 20 determines whether or not the reconfigured virtual machine (in this example, the virtual machine A(SBY) mounted on the general-purpose device 11) is normal (step S5). Even the standby-system virtual machine A(SBY) is in a state immediately before the activation, and whether or not the virtual machine A(SBY) is normal can be determined by the same method as in the case of detecting a failure of the active system, such as whether or not a response to the health check has been made.

When the reconfigured virtual machine A(SBY) is normal (YES in step S5), the virtual machine controller 20 returns to the processing for detecting a failure of the active-system virtual machine (ACT) (NO in step S9).

When the reconfigured virtual machine A(SBY) is abnormal (FIG. 3(d)) (NO in step S5), the virtual machine controller 20 reconfigures the standby-system virtual machine A(SBY) on a general-purpose device (e.g., general-purpose device 13) different from the general-purpose device 11 on which the virtual machine A(SBY) was reconfigured in steps S3 and S4 (step S6). FIG. 3(e) schematically shows this state.

As shown in FIG. 3(e), the virtual machine A(SBY) surrounded by a dashed line has been reconfigured on the general-purpose device 13 (HW(3)). It is determined whether or not the virtual machine A(SBY) reconfigured on the general-purpose device 13 is normal (step S7). When it is normal (YES in step S7), the processing returns to the processing for detecting a failure of the active-system virtual machine (ACT) (step S1).

When the virtual machine A(SBY) reconfigured on the general-purpose device 13 is abnormal, the virtual machine controller 20 changes the general-purpose device to another general-purpose device and repeats the processing of steps S6 and S7 until the reconfigured virtual machine A(SBY) is determined to be normal (step S8). Note that the virtual machine controller 20 may reconfigure the virtual machine A(SBY) again on the general-purpose device 13. When the virtual machine A(SBY) reconfigured on the general-purpose device 13 again is abnormal, the virtual machine controller 20 may change the general-purpose device to, for example, a general-purpose device 14 (not shown) and reconfigures the virtual machine A(SBY).

By repeating the processing of steps S6 and S7, the virtual machine controller 20 can reconfigure the normal virtual machine A(SBY) on any general-purpose device. That is, the duplex operation state can be maintained.

As described above, the duplex operation system 100 according to the present embodiment is a duplex operation system including: the plurality of general-purpose devices 11 to 13 on which the plurality of virtual machines A, B, . . . are mounted; and the virtual machine controller 20 that controls the duplex operation performed by two systems, the active system (ACT) and the standby system (SBY), of the virtual machines. When detecting a failure of the active system (ACT), the virtual machine controller 20 stops the active-system (ACT) virtual machine and activates the standby-system (SBY) virtual machine corresponding to the stopped active system (ACT). Further, the virtual machine controller 20 reconfigures the standby-system (SBY) virtual machine on the hardware of the stopped virtual machine, and when detecting a failure in the reconfigured standby-system (SBY) virtual machine, the virtual machine controller 20 reconfigures the failed standby-system (SBY) virtual machine on the general-purpose device 13 different from the general-purpose device 11 in which the virtual machine has been stopped. It is thereby possible to provide the duplex operation system 100 in which a range where a duplex operation state can be maintained is expanded. Further, it is possible to reduce the work requiring the intervention of a maintenance person.

Second Embodiment

Figure 4:
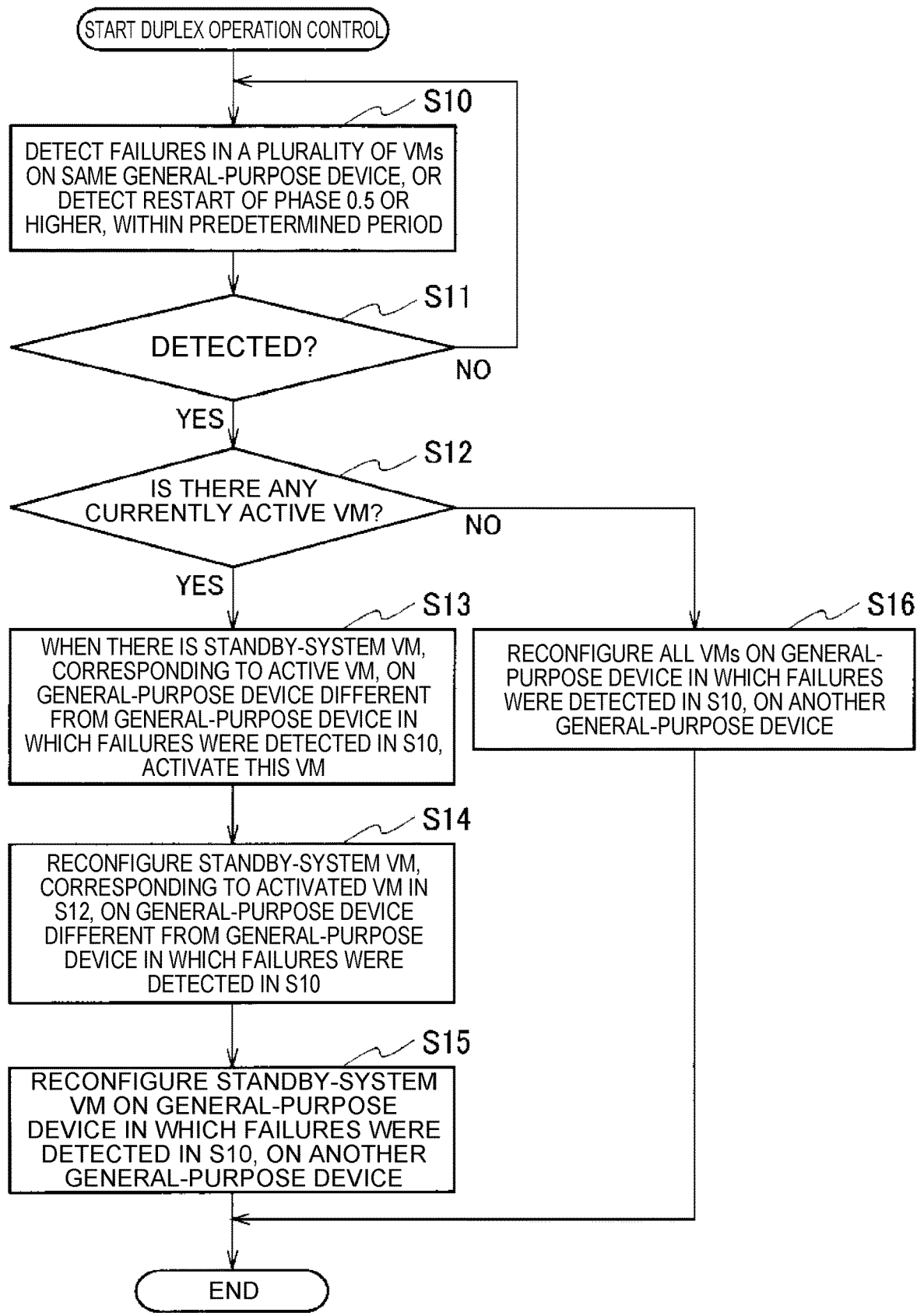
FIG. 4 is a flowchart showing a processing procedure of a part of an outline of a duplex operation system according to a second embodiment of the present invention.

FIG. 4 is a flowchart showing a processing procedure of an outline of a duplex operation system according to a second embodiment of the present invention. A duplex operation system 200 (not shown) for performing the processing procedure shown in FIG. 4 detects a suspicion of a hardware failure from the states of a plurality of virtual machines mounted on one general-purpose device and reconfigures the virtual machine on the hardware on another general-purpose device.

When the restart at a predetermined level of a predetermined number or more of virtual machines occurs, or when failures (abnormalities) of the predetermined number or more of virtual machines are detected, within a predetermined period in any general-purpose device 11, a virtual machine controller 22 (not shown) constituting a duplex operation system 200 reconfigures the virtual machine, mounted on the general-purpose device 11, on another general-purpose device 15 (not shown), for example.

The restart at a predetermined level means, for example, a restart of phase 0.5 or higher. The restart of phase 0.5 means an individual process reset. Therefore, when the restart of phase 0.5, for example, occurs, or when, for example, the virtual machine fails three times or three virtual machines fail on the general-purpose device 11, within a predetermined period, the virtual machine controller 22 reconfigures the virtual machine, mounted on the general-purpose device 11 in which the failure (abnormality) has been detected, on another general-purpose device 15, for example.

The condition for reconfiguring the virtual machine on another general-purpose device 15 is not limited to the restart of phase 0.5 three times. Table 1 shows examples of the condition for reconfiguring the virtual machine on another general-purpose device 15.

TABLE 1

| Restart phase, failure | Number of machines detected |
|---|---|
| Phase 0.5 | $m_1$ |
| Phase 1.0 | $m_2$ |
| Phase 2.0 | $m_3$ |
| Phase 2.5 | $m_4$ |
| Phase 3.0 | $m_5$ |
| FLT | $m_6$ | where $m_1$ to $m_6$ are arbitrary integers. $m_6$ is the number of virtual machines stopped (FLT) due to failures. As the phase restart value increases, the range of processes to be reset increases. For example, phase 1.0 is a restart in which the process reset of all applications and the switching between the active system and the standby system are performed. As described above, there can be considered a number of conditions for reconfiguring the virtual machine on another general-purpose device 15.

Referring to FIG. 4, the operation of the duplex operation system 200 of the present embodiment will be described in detail. In addition to the processing of the above embodiment, the virtual machine controller 22 detects a case where the restart of phase 0.5 or higher of a plurality of virtual machines on the same general-purpose device 11 has occurred, or a case where a plurality of virtual machines on the same general-purpose device 11 have failed, within a predetermined period (step S10). The predetermined period here is, for example, a time interval of 10 minutes, and the plurality is, for example, the number of units such as three units.

When detecting a plurality of failures within a predetermined period (step S11), the virtual machine controller 22 determines whether or not there is a virtual machine active (ACT) on the general-purpose device 11 (step S12). When there is an active (ACT) virtual machine, the virtual machine controller 22 stops the active (ACT) virtual machine on the general-purpose device 11. Then, when there is a standby-system (SBY) virtual machine corresponding to the stopped virtual machine on another general-purpose device (e.g., general-purpose device 12), the virtual machine controller 22 activates another general-purpose device (step S13).

Next, the virtual machine controller 22 reconfigures the standby-system (SBY) virtual machine, which corresponds to the virtual machine activated in step S13, on a general-purpose device (e.g., a general-purpose device 12) different from the general-purpose device 11 in which the plurality of failures have been detected (step S14).

Then, the virtual machine controller 22 reconfigures the virtual machine, which has originally been the standby system (SBY) on the general-purpose device 11 where the plurality of failures have been detected, on another general-purpose device (except for the general-purpose device 11) (step S15). When there is no virtual machine active (ACT) on the general-purpose device 11 (NO in step S12), the virtual machine controller 22 reconfigures the virtual machine on the general-purpose device 11 on another general-purpose device (except for the general-purpose device 11) (step S16).

As described above, when a plurality of failures are detected in one general-purpose device 11, for example, during a predetermined period, the virtual machine on the general-purpose device 11 is moved away to another general-purpose device (except for the general-purpose device 11).

As described above, when the restart of phase 0.5 or higher of a predetermined number or more of virtual machines occur, or when failures of a predetermined number or more of virtual machines are detected, within a predetermined period on the general-purpose device, the virtual machine controller 22 according to the present embodiment reconfigures the virtual machine, mounted on the general-purpose device, on another general-purpose device. Thus, the virtual machine controller 22 according to the present embodiment can move away, in advance, all the virtual machines on the hardware (general-purpose device) suspected to have failed, thereby shortening the time for which the provision of the service becomes unstable. That is, the reliability of the duplex operation system can be improved.

(Comparison with Comparative Example)

FIG. 5 shows results of a comparison between a duplex operation system of a comparative example and the duplex operation system of the present embodiment. In FIG. 5, the first column from the left shows a phase restart level, an active system in the second column shows the comparative example, a standby system in the third column shows the comparative example, and a standby system in the fourth column shows the present embodiment. The escalation destination is the restart escalation, and the restart of the active system of PH 0.5 in the first row means the restart of phase 0.5. PH 1.0 on the right-hand side thereof means that when the restart of phase 0.5 is performed and the restart does not occur, the restart of phase 1.0 is performed next.

The restart of the standby system of PH 0.5 in the first row indicates that when the restart of phase 0.5 is performed and the restart does not occur, the work by the maintenance person is necessary. As shown in FIG. 5, in the standby-system virtual machine of the comparative example, when the restart of phase 0.5 is performed and the restart does not occur, all the operations need to be performed by the maintenance person.

In contrast to the comparative example, the standby system incorporating the present embodiment indicates that the virtual machine is reconfigured on another general-purpose device even when the restart at any level is performed. As thus described, according to the duplex operation system of the present embodiment, it is possible to widen the range in which the duplex operation state can be maintained. Further, it is possible to reduce the work requiring the intervention of a maintenance person.

As described above, according to the duplex operation systems 100, 200 of the present embodiments, it is possible to provide a system for duplex operation and a method therefor in which an expanded range where a duplex operation state can be maintained is expanded.

Needless to say, the present invention includes various embodiments and the like which are not described herein. Therefore, the technical scope of the present invention is determined only by the matters specifying the invention according to the claims that are reasonable from the above description.

REFERENCE SIGNS LIST 100, 200 Duplex operation system
11, 12, 13 General-purpose device
20, 22 Virtual machine controller
VM Virtual machine
HV Hypervisor
ACT Active system
SBY Standby system

The invention claimed is:

1. A duplex operation system comprising:
a plurality of general-purpose devices on each of which a plurality of virtual machines are mounted; and
a virtual machine controller that controls a duplex operation performed by two systems, an active system and a standby system, of the plurality of virtual machines, wherein:
when detecting a failure of the active system, the virtual machine controller stops the virtual machine of the active system, activates the virtual machine of the standby system corresponding to the active system of the stopped virtual machine, and reconfigures the standby system of the activated virtual machine on hardware of the stopped virtual machine, and
when detecting a failure in the virtual machine of the reconfigured standby system, the virtual machine controller reconfigures the standby system of the failed virtual machine on a general-purpose device different from the general-purpose device in which the virtual machine of the active system has been stopped.

2. The duplex operation system according to claim 1, wherein when a restart of phase 0.5 or higher of a predetermined number or more of virtual machines occurs, or when failures of a predetermined number or more of virtual machines are detected, within a predetermined period on the general-purpose device, the virtual machine controller reconfigures the virtual machine, mounted on the general-purpose device, on another general-purpose device.

3. A duplex operation method performed by a virtual machine controller of a duplex operation system that includes:
a plurality of general-purpose devices on each of which a plurality of virtual machines are mounted, and
a virtual machine controller that controls a duplex operation performed by two systems, an active system and a standby system, of the plurality of virtual machines,
the method comprising:
in response to detecting a failure of the active system, the virtual machine controller stops the virtual machine of the active system, activates the virtual machine of the standby system corresponding to the active system of the stopped virtual machine, and reconfigures the standby system of the activated virtual machine on hardware of the stopped virtual machine; and
in response to detecting a failure in the virtual machine of the reconfigured standby system, the virtual machine controller reconfigures the standby system of the failed virtual machine on a general-purpose device different from the general-purpose device in which the virtual machine of the active system has been stopped.

4. The duplex operation method according to claim 3, wherein when a restart of phase 0.5 or higher of a predetermined number or more of virtual machines occurs, or when failures of a predetermined number or more of virtual machines are detected, within a predetermined period on the general-purpose device, the virtual machine controller reconfigures the virtual machine, mounted on the general-purpose device, on another general-purpose device.

* * * * *